UNITED STATES PATENT OFFICE.

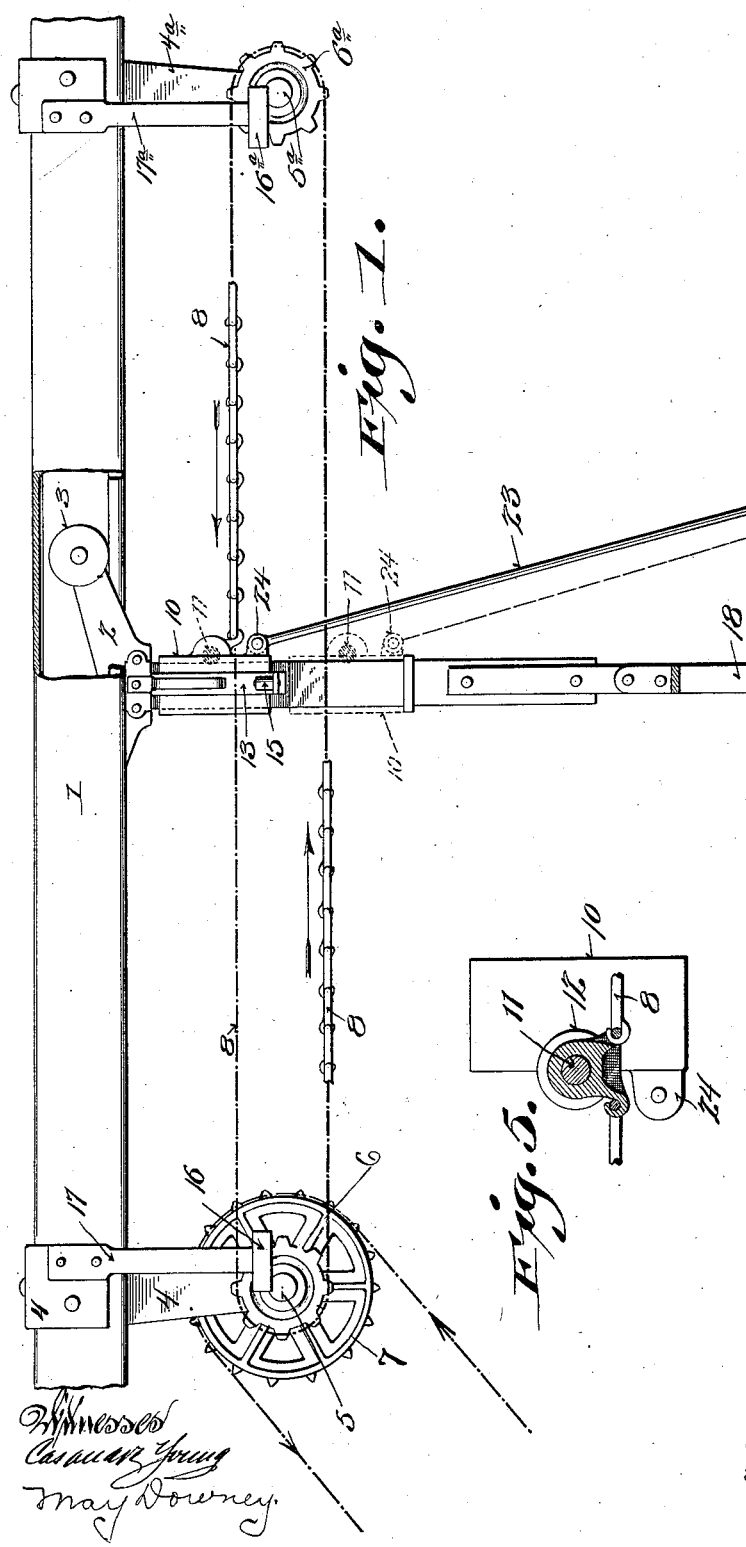

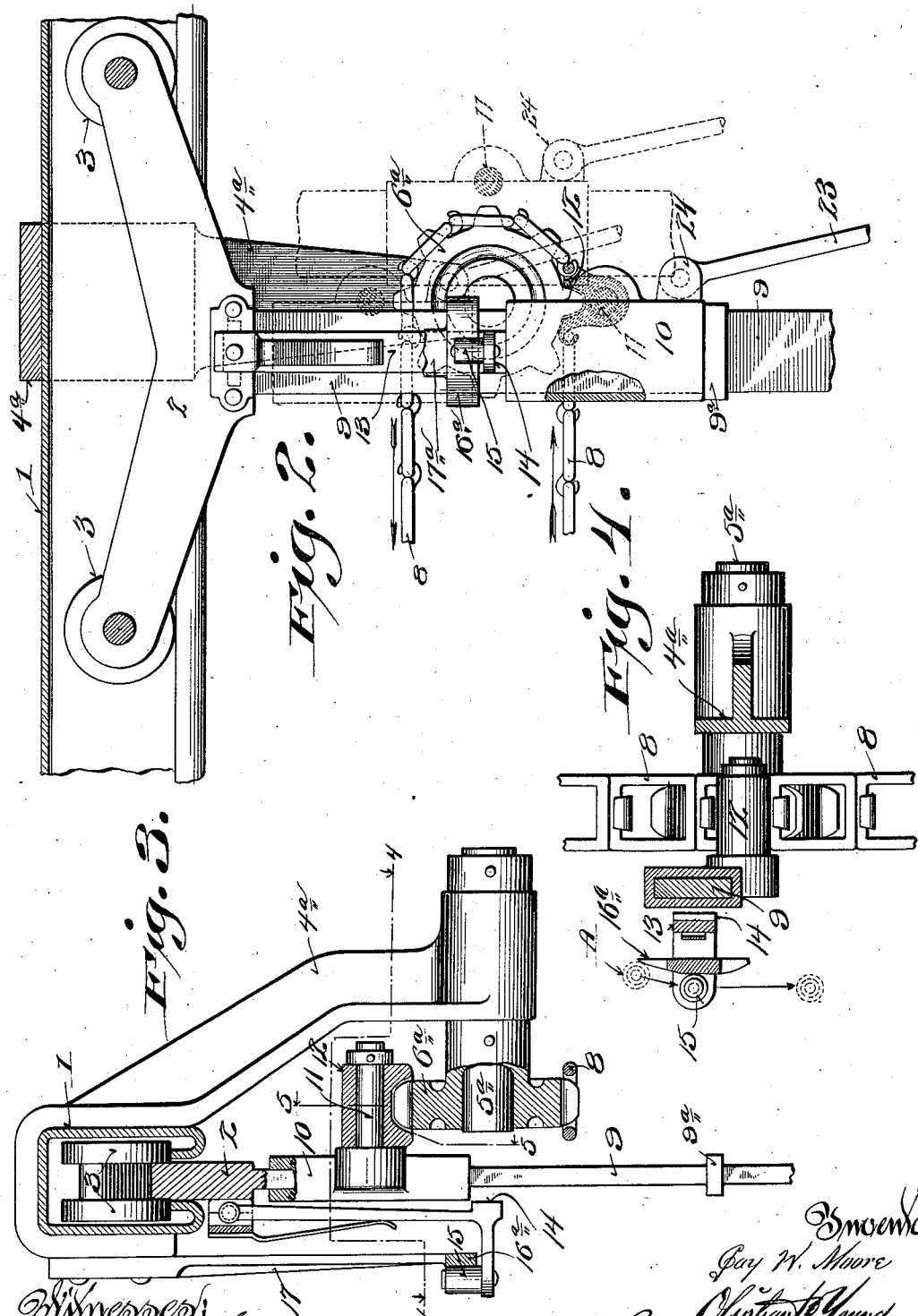

JAY W. MOORE, OF GAYS MILLS, WISCONSIN, ASSIGNOR TO STOELTING BROTHERS CO., OF KIEL, WISCONSIN.

CARRIER.

1,019,175. Specification of Letters Patent. Patented Mar. 5, 1912.

Original application filed January 10, 1911, Serial No. 601,811. Divided and this application filed June 29, 1911. Serial No. 636,119.

*To all whom it may concern:*

Be it known that I, JAY W. MOORE, a citizen of the United States, and resident of Gays Mills, in the county of Crawford and State of Wisconsin, have invented certain new and useful Improvements in Carriers; and I do hereby declare that the following is a full, clear, and exact description thereof.

My invention refers to carriers, the same being a division of an application for patent for improvements in carriers filed by me January 10, 1911, Serial No. 601,811, the primary object being to provide simple effective and economically constructed automatic reversing mechanism for endless belt-driven carriers, to which may be attached any form of agitator, hopper or analogous device.

The invention further contemplates providing means for effecting a change of position of the carrier device incidental to change of direction of its travel, the invention being particularly applicable to a curd stirring device or shovel that is arranged to travel back and forth within a vat containing such product.

Specific objects of my device are to provide a shackle connection between the endless belt and carrier; to provide a link connection between the shackle and carrier device, whereby change of position of the same is effected incidental to the reversal of the direction of travel of said carrier, which reversal is effected as the belt turns.

With the above objects in view my invention consists in certain peculiarities of construction and combination of parts as hereinafter set forth with reference to the accompanying drawings and subsequently claimed.

In the drawings Figure 1 represents a side elevation of a carrier embodying the features of my invention, the carrier being shown connected to a curd-stirring device or shovel arranged to travel back and forth in the vat; Fig. 2, an enlarged detail elevation of the upper portion of the carrier mounted upon a track section, having parts broken away and parts in section to more clearly illustrate the invention; Fig. 3, an end view of the same with certain parts broken away and other parts in section to more clearly show the structural features; Fig. 4, a detail plan section as indicated by line 4—4 of Fig. 3, and Fig. 5, a detail face view of the carrier shackle with its chain attaching link in section as indicated by line 5—5 of Fig. 3.

Referring by characters to the drawings, 1 represents an inverted U-shaped track having inturned edges that constitute track members for the support of a trolley or carrier 2, wheels 3 of which are adapted to travel upon the track. Hangers 4, 4$^a$, depend from the track member for the support of arbors 5, 5$^a$, upon which arbors are mounted sprocket-wheels 6, 6$^a$. Power is applied to the drive-sprocket 6 by a sprocket-wheel 7 that is also fast upon the arbor 5, as shown in Fig. 1, the drive and driven sprockets 6 and 6$^a$ serving as supports for an endless link-belt 8 which is disposed under the track member and parallel therewith.

The carrier is provided with a depending shank 9 upon the upper end of which is slidably mounted a sleeved shackle 10 having a projecting stud 11 upon which is swiveled an eared chain link 12 that constitutes one member of the endless belt, the same being recessed for the reception of the sprocket-teeth incidental to the travel of said link about the drive and driven sprockets. As shown in Fig. 1, the shackle connection between the endless belt and carrier shank is upon the upper stretch of said chain, the same being illustrated as traveling in the direction indicated by the arrow, in which position the shackle is locked with relation to the carrier shank by a spring-controlled catch 13, the upper end of the catch being in hinge connection with the carrier while its lower end is provided with a locking nose 14 adapted to engage the upper and lower edges of the shackle sleeve whereby the same is locked when traveling upon the upper or lower stretches of the endless belt.

A tappet 15 in the form of a roller extends from the lower end of the spring-controlled catch 13, the said tappet being adapted to engage fixed cams 16, 16$^a$, which are permanently secured to the track-member by upwardly extended arms 17, 17$^a$, the said cams being located in approximate alinement with the sprocket arbors.

The lower end of the carrier shank has extending therefrom a bail 18 to which is fulcrumed the longitudinal bars 19 of an agitator device 20, the longitudinal bars together with transverse bars 20' of which comprise a rectangular frame. The transverse bars 20' of the agitator are connected by a series of bowed rods 21 forming a grid. One of the transverse bars 20' has extending therefrom an ear 22 to which is pivoted one end of a reversing link 23, the opposite end thereof being pivoted between ears 24 that extend from the shackle sleeve.

Referring to Fig. 2, the carrier is shown as traveling upon the lower stretch of the belt in the direction indicated by the arrow, the sleeve being locked between the nose of the catch and a shoulder 9ª of the carrier shank. In this position the chain link 12, which is in swivel connection with the shackle, has just engaged a tooth of the driven sprocket 6ª and incidental to its engagement, the tappet roller 15 has engaged and traveled up an inclined face of the cam 16ª, whereby the nose 14 of said catch is freed from its engaged position with the upper edge of the shackle sleeve. The shackle is now free to slide upon the carrier shank, and, as the chain link 12 rotates about the sprocket wheel, the nose of the catch travels upon the face of the shackle sleeve and is thereby held in its extended position, the sleeve in the meantime having moved upon the shank to the position indicated in Figs. 3 and 1, whereby the shackle is shifted from the lower to the upper belt stretch. The direction of travel of the carrier, owing to the crank movement imparted by the sprocket-wheel to the shackle, is thus reversed and said carrier now starts upon its return movement. Incidental to the shift of the shackle from the lower to the upper belt stretch, the reversing link connection 23 between said shackle and agitating device causes the same to tilt, changing its inclination to the position shown in full lines Fig. 1. The tappet roller travels back over the cam and down the incline to the position as indicated at A, Fig. 4, and the nose portion thereof is thereby forced by spring pressure under the lower edge of the shackle sleeve as indicated in Fig. 3. The shackle sleeve being now locked in its upper position, will relieve the driving belt of all strain and at the same time securely lock the curd agitator at the proper angle to plow through the curd contained in the trough whereby the same is split into shreds as it passes between the grid bars.

When the carrier reaches the belt turn at the driving end of the track, the tappet will engage cam 16 whereby the shackle is unlocked from the carrier shank and the reverse movement is repeated, causing the curd agitator to again assume the inclined position as indicated by dotted lines in Fig. 1.

From the foregoing description it will be seen that the carrier is moved back and forth due to its belt connection and that a shift of position of the agitator or other device is obtained simultaneous with the shift of direction of travel of said carrier, and, while I have shown and described the carrier as being provided with a curd agitator it is apparent that any form of hopper spiral or analogous device may be suspended from said carrier and the link 23 connected thereto is operated to change the position or effect some mechanical movement incidental to the reverse of travel.

I claim:

1. A carrier comprising a track, a trolley mounted thereon having a depending shank, an endless belt disposed parallel with the track, a shackle carried by the belt in slidable engagement with the trolley-shank, a device fulcrumed to the shank, and a reversing link connecting the device and shackle, whereby the position of the device is changed incidental to movement of the shackle.

2. A carrier comprising a track, a trolley mounted thereon having a depending shank, an endless belt disposed parallel with the track, a shackle carried by the belt in slidable engagement with the trolley shank, an agitating device suspended from the carrier, and a reversing link connecting the agitating device and shackle whereby the position of the agitating device is changed incidental to movement of the shackle.

3. A device of the character described comprising a track-supported carrier, an agitator fulcrumed to said carrier, and a reversing mechanism connecting the agitator and driving belt whereby the inclination of said agitator is changed, and a lock and release means for the reversing mechanism.

4. A carrier comprising a track, a trolley mounted thereon having a depending shank, an endless belt disposed parallel with the track, a shackle carried by the belt in slidable engagement with the trolley shank, an agitating device fulcrumed to the shank, a reversing link connecting the agitating device and shackle, whereby the position of the agitating device is changed incidental to movement of the shackle, means for locking the shackle to the trolley-shank in its changed position, and fixed releasing means for engagement with the shackle lock disposed adjacent to the belt turns.

5. A carrier comprising an inverted U-shaped track having inturned edges, a trolley provided with wheels adapted to engage the inturned edges of the track, a shank extending from the trolley, an endless belt disposed parallel with and under the track, a shackle sleeve carried by the belt in slidable engagement with the trolley-shank, an agitating device fulcrumed to said trolley-shank, a reversing link connecting the agitating device and shackle, whereby the position of the agitator is changed incidental to movement of the shackle, means carried by the aforesaid trolley-shank for locking the shackle at different elevations upon the shank, whereby the agitator is secured in its changed position, and means carried by the track adjacent to the belt turns for effecting release of the locking means.

In testimony that I claim the foregoing I have hereunto set my hand at Gays Mills in the county of Crawford and State of Wisconsin in the presence of two witnesses.

J. W. MOORE.

Witnesses:
O. A. SHERWOOD,
F. R. GARVEY.

Copies of this patent may be obtained for five cents each, by addressing the "Commissioner of Patents, Washington, D. C."